Patented Nov. 6, 1951

2,573,695

UNITED STATES PATENT OFFICE 2,573,695

HYDROHALOGENATION OF OLEFINS

Arthur A. Dolnick and Harold Naidus, Philadelphia, Pa., assignors to Publicker Industries Inc., Philadelphia, Pa.

No Drawing. Application October 3, 1945, Serial No. 620,189

6 Claims. (Cl. 260—654)

The present invention relates to the production of halogenated hydrocarbons or the like and it relates more particularly to a new and improved process for the production of halogenated hydrocarbons or the like by effecting the addition of hydrogen halides, other than hydrogen fluoride, to unsaturated hydrocarbons or the like in the presence of suitable catalysts.

An object of the present invention is to provide a new and improved process for the production of halogenated hydrocarbons or the like. Another object of the present invention is to provide a new, practical, economical and commercially desirable process for the manufacture of halogenated compounds from olefinic and polyolefinic hydrocarbons. Still another object of the present invention is to provide a new and improved process for effecting the addition of hydrogen halides other than hydrogen fluoride to unsaturated hydrocarbons or the like in the presence of water and of relatively small amounts of appropriate catalysts in such a manner as to produce a high yield with a minimum of polymer formation.

Other objects and advantages of the present invention are apparent in the following detailed description and appended claims.

Various methods have been suggested, in the past, for the production of halogenated hydrocarbons from the corresponding unsaturated compounds. However, certain disadvantages attendant upon these methods have rendered them not particularly suitable for the commercial production of a variety of halogenated compounds.

For example, the addition of aqueous hydrochloric acid to butadiene under the conditions described by Kharasch and co-workers (J. Org. Chem., vol. 2, p. 489, 1937) is accompanied by considerable polymer formation with corresponding reduction in yield of desired product. The addition of anhydrous hydrogen chloride to butadiene is accompanied by the same disadvantage.

The use of solvents such as acetic acid for the addition of hydrogen chloride to butadiene (as described by Kharasch et al., supra, and also in Dykstra 2,123,504) or for the addition of hydrogen bromide to butadiene (as described in Meisenburg 1,725,156) also has obvious disadvantages. Thus, the solution of the hydrogen halide in the solvent must first be prepared and, after the reaction is complete, the solvent must be separated from the halide by processes such as distillation or extraction.

The preparation of halogenated hydrocarbons by the addition of at least equimolar quantities of sulphuric acid to the corresponding olefin to form the sulphates, followed by the replacement of the sulphate radical by a chlorine atom on treatment with hydrogen chloride (as suggested in Calcott et al. 2,016,072 and Ballard 2,284,467), involves the use of large quantities of sulphuric acid and is, essentially, a two-step reaction. Furthermore the method is not applicable to diolefins since the latter polymerize in the presence of high sulphuric acid concentrations.

The use of metallic salts as catalysts for the addition of hydrogen chloride and butadiene in polar solvents has been described in Dykstra 2,123,504. However, when aqueous hydrochloric acid is used with a salt like cuprous chloride as a catalyst, undesirable side reactions occur which result in the formation of high-boiling products. Thus, when methallyl halides are prepared according to Dykstra's process, the yields obtainable range from an optimum figure of 84% down to as low as 27%. On the other hand, when the corresponding methallyl halides are prepared according to our present process, to be described herein below, almost quantitative yields are obtained.

Generally speaking, the present invention comprehends the production of halogenated hydrocarbons by the treatment of the corresponding hydrocarbons with hydrohalic acid, other than hydrofluoric acid, in the presence of relatively small amounts of catalyst. More specifically, a preferred embodiment of the present invention comprehends the treatment of hydrocarbons with an aqueous solution of hydrohalic acid in the presence of relatively small amounts of certain catalysts including sulphuric acid, phosphoric acid and such aryl sulfonic acids as benzene sulfonic acid, and ortho, meta and para toluenesulfonic acids, so as to give high yields of the corresponding halogenated hydrocarbons with minimum amounts of polymer or oxidation products.

The following are illustrative, but not restrictive, examples of the process of the present invention.

*Example 1*

54 parts by weight of butadiene is added to a mixture of 177 parts of well cooled concentrated hydrochloric acid (specific gravity 1.18) and 48 parts of 75% sulphuric acid. The mixture is then stirred in a glass-lined autoclave at 60° C. for four hours after which the vessel is opened, and the upper layer is separated, washed with saturated potassium carbonate solution and distilled. None of the material boils above 85° C. the boiling point of crotyl chloride. A mixture of 1-chlorobutene-2 and 2-chlorobutene-3 in a yield of about 94% of theory, based on the butadiene charged, is obtained. When the sulphuric acid catalyst is omitted from the reaction, the yield of chlorobutenes is about 20% less, calculated on the same basis.

*Example 2*

A mixture of 54 parts of butadiene, 102 parts of hydrochloric acid (specific gravity 1.18) and 0.36 M benzene-sulfonic acid is stirred for 19 hours at 45° C. in an autoclave. After separation, washing and distillation of the upper layer as described in Example 1, a mixture of chlorobutenes is obtained in yield about 30% greater than that obtainable when no benzenesulfonic acid is used.

*Example 3*

The procedure of Example 2 is repeated except that p-toluenesulfonic acid is used in place of the benzenesulfonic acid, with comparable results.

*Example 4*

A mixture of 54 parts of butadiene, 102 parts of hydrochloric acid (specific gravity 1.18) and 20 parts of 85% phosphoric acid is stirred for 19 hours at 50° C. After separation, washing and distillation as in Example 1, a mixture of chlorobutenes is obtained in yield about 15% greater than that obtainable when no phosphoric acid is employed.

*Example 5*

51 parts (0.87 M) of sodium chloride is added to a well-cooled solution of 172 parts of 71.5% sulphuric acid (1.25 M). 27 parts of butadiene is then added and the mixture is stirred at 70° C. for three hours in a glass-lined autoclave. After cooling, the upper layer is separated, washed and distilled. A yield of 1-chlorobutene-2 and 2-chlorobutene-3 of about 87% of theory, based on the butadiene charged, is obtained. When equimolar amounts of sodium chloride and sulphuric acid are used, the yield is about 7% less.

*Example 6*

A mixture of 54 parts of butadiene, 200 parts of 48% hydrobromic acid, and 48 parts of 75% sulphuric acid is stirred for one hour at 60° C. After separation, washing and distillation of the upper layer, a mixture of 1-bromobutene-2 and 2-bromobutene-3 is obtained in yield 34% greater than that obtainable when no sulphuric acid is employed.

*Example 7*

82 parts of mixed methylpentadienes is added to 177 parts of well cooled hydrochloric acid (specific gravity 1.18), containing 48 parts of 75% sulphuric acid, in a glass-lined autoclave. After the mixture is stirred at 60° C. for one hour, the upper layer consisting of a mixture of chloromethylpentenes is separated, washed with saturated potassium carbonate solution, and with water, and dried. The yield of chloromethylpentenes is about 65% of theory. When the procedure is repeated omitting the sulphuric acid, the yield of chloromethylpentenes is about 11% less.

*Example 8*

41 parts of cyclohexene is added to 89 parts of well-cooled hydrochloric acid (specific gravity 1.18) containing 24 parts of 75% sulphuric acid. The mixture is stirred for four hours at 45° C. in a glass-lined autoclave whereupon an upper layer is separated, washed, and distilled to give chlorocyclohexane in yield of about 63% of theory. When the procedure is repeated omitting sulphuric acid the yield of chlorocyclohexane is about 30% lower.

*Example 9*

56 parts of butene-2 is added to 177 parts of well-cooled hydrochloric acid (specific gravity 1.18) containing 48 parts of 75% sulphuric acid. The mixture is stirred for four hours at 60° C. in a glass-lined autoclave whereupon the upper layer is separated, washed and distilled. The yield of 2-chlorobutene is about 75% of theory. When the procedure is repeated omitting the sulphuric acid, the yield of 2-chlorobutane is about 15% lower.

*Example 10*

104 parts of styrene is added to 177 parts of well-cooled hydrochloric acid (specific gravity 1.18) containing 48 parts of 75% sulphuric acid. The mixture is stirred for four hours at 60° C. in a glass-lined autoclave after which the upper layer is separated, washed and distilled. The yield of alpha-chloroethylbenzene is about 89% of theory. When the procedure is repeated omitting the sulphuric acid, the yield of alpha-chloroethylbenzene is about 20% lower.

*Example 11*

54 parts of butadiene is added to 400 parts of a well-cooled solution of hydroiodic acid (specific gravity 1.5) and 96 parts of 75% sulphuric acid. The mixture is stirred for four hours at room temperature in a glass-lined autoclave whereupon the upper layer is separated, washed and distilled. The yield of crotyl iodide is about 2.5 times greater than that obtainable when no sulphuric acid is employed.

*Example 12*

A mixture of 68 parts of isoprene, 177 parts of hydrochloric acid (specific gravity 1.18) and 48 parts of 75% sulphuric acid is stirred in an autoclave at room temperature for four hours. A mixture of chloropentenes is obtained in about 60% yield as compared with a considerably lower yield obtained when the sulphuric acid is omitted.

*Example 13*

54 parts by weight of butadiene is added to a mixture of 102 parts of well-cooled hydrochloric acid (sp. gr. 1.18) and 10 parts of 96% sulphuric acid. The mixture is then stirred in a glass-lined autoclave at 50° for 19 hours. The procedure of Example 1 is then followed. When the sulfuric acid catalyst is omitted from the reaction, the yield of chlorobutenes is about 15% less.

*Example 14*

The procedure of Example 13 is followed, except that 20 parts of 61% sulfuric acid is used as the catalyst. The yield is about 15% greater than when no sulfuric acid is used.

While we prefer to carry out our process in water (which gives the best results as well as being the lowest in cost), other liquids may be employed, as, for example, glacial or aqueous acetic acid, benzene, toluene, etc.

Generally speaking, we prefer to employ the highest concentration of sulphuric acid or other catalyst which will not polymerize the unsaturated compound or otherwise cause undesirable side reactions. By employing lower reaction temperatures and/or shorter reaction times, it is possible to use higher concentrations of sulphuric acid or other catalysts.

As used in the appended claims, the expression "a 1,3 butadiene" is intended to include not only 1,3 butadiene itself but also such homologs thereof as isoprene, methylpentadiene, etc.

The present invention may be embodied in other specific forms without departing from the spirit or essential attributes thereof, and it is therefore described that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. In a process for reacting a 1,3 butadiene with a member of the group consisting of HCl, HBr and HI; the step which comprises carrying out the reaction in water at somewhat above room temperature in the liquid phase and in the presence of a catalyst comprising a member of the group consisting of sulphuric acid, phosphoric acid, benzenesulfonic acid and toluenesulfonic acids, said last-mentioned member being present in substantially less than equimolecular quantity based on the butadiene.

2. In a process for reacting a 1,3 butadiene with a member of the group consisting of HCl, HBr and HI; the step which comprises carrying out the reaction in water at somewhat above room temperature in the liquid phase and in the presence of sulphuric acid, said sulphuric acid being present in substantially less than equimolecular quantity based on the butadiene.

3. In a process for reacting a 1,3 butadiene with a member of the group consisting of HCl, HBr and HI; the step which comprises carrying out the reaction in water at somewhat above room temperature in the liquid phase and in the presence of phosphoric acid, said phosphoric acid being present in substantially less than equimolecular quantity based on the butadiene.

4. In a process for reacting a 1,3 butadiene with a member of the group consisting of HCl, HBr and HI; the step which comprises carrying out the reaction in water at somewhat above room temperature in the liquid phase and in the presence of benzenesulfonic acid, said benzenesulfonic acid being present in substantially less than equimolecular quantity based on the butadiene.

5. In a process for reacting a 1,3 butadiene with a member of the group consisting of HCl, HBr and HI; the step which comprises carrying out the reaction in water at somewhat above room temperature in the liquid phase and in the presence of a toluenesulfonic acid, said toluenesulfonic acid being present in substantially less than equimolecular quantity based on the butadiene.

6. In a process for reacting isoprene with a member of the group consisting of HCl, HBr and HI; the step which comprises carrying out the reaction at somewhat above room temperature in the liquid phase and in the presence of a member of the group consisting of sulphuric acid, phosphoric, benzenesulfonic acid and toluenesulfonic acids, said last-mentioned member being present in substantially less than equimolecular quantity based on isoprene.

ARTHUR A. DOLNICK.
HAROLD NAIDUS.

REFERENCES CITED

The following references are of record in the file of this patent:

UNITED STATES PATENTS

| Number | Name | Date |
|---|---|---|
| 2,144,816 | Schaad | Jan. 24, 1939 |
| 2,284,467 | Ballard | May 26, 1942 |